(12) United States Patent
Popp et al.

(10) Patent No.: US 8,394,000 B2
(45) Date of Patent: Mar. 12, 2013

(54) METHOD FOR OPERATING A VEHICLE DRIVETRAIN

(75) Inventors: Christian Popp, Kressbronn (DE);
Klaus Steinhauser, Kressbronn (DE);
Jorg Arnold, Immenstaad (DE);
Valentine Herbeth, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 534 days.

(21) Appl. No.: 12/435,535

(22) Filed: May 5, 2009

(65) Prior Publication Data
US 2009/0280951 A1 Nov. 12, 2009

(30) Foreign Application Priority Data

May 6, 2008 (DE) .......................... 10 2008 001 566

(51) Int. Cl.
*B60W 10/04* (2006.01)
*B60W 10/00* (2006.01)
*F16H 59/00* (2006.01)
(52) U.S. Cl. .......................... 477/107; 477/77; 74/336 R
(58) Field of Classification Search .................. 477/107, 477/109, 111, 77, 174, 175, 180, 181; 74/329, 74/330, 331, 335, 340, 336 R; 475/302, 475/303
See application file for complete search history.

(56) References Cited

U.S. PATENT DOCUMENTS

| 3,834,499 | A | * | 9/1974 | Candellero et al. | 477/73 |
|---|---|---|---|---|---|
| 4,544,057 | A | * | 10/1985 | Webster et al. | 477/86 |
| 4,653,351 | A | * | 3/1987 | Downs et al. | 477/148 |
| 5,086,670 | A | * | 2/1992 | Nitz et al. | 477/154 |
| 6,009,768 | A | * | 1/2000 | Hoshiya et al. | 74/336 R |
| 6,213,909 | B1 | * | 4/2001 | Raghavan | 475/282 |
| 2003/0109358 | A1 | * | 6/2003 | Sakamoto et al. | 477/109 |
| 2005/0059529 | A1 | * | 3/2005 | Sakamoto et al. | 477/174 |
| 2006/0021846 | A1 | * | 2/2006 | Tanba et al. | 192/218 |
| 2007/0167284 | A1 | | 7/2007 | Steinhauser et al. | |
| 2008/0305931 | A1 | * | 12/2008 | Eich et al. | 477/174 |
| 2010/0190602 | A1 | * | 7/2010 | Wittkopp et al. | 475/303 |

FOREIGN PATENT DOCUMENTS

DE 199 23 089 A1 11/2000
DE 10 2006 002 122 A1 7/2007

* cited by examiner

*Primary Examiner* — Roger Pang
(74) *Attorney, Agent, or Firm* — Davis & Bujold, PLLC

(57) ABSTRACT

A method for operating a vehicle drivetrain (1) having a drive motor (9), a transmission (10) and a drive output (2). When a gear ratio change is called for in the transmission (10), between an actually engaged gear and a target gear, one of a frictional or an interlock-type shift element is engaged in a flow of force in the vehicle drivetrain (1) and the other of an interlock-type or a frictional shift element is disengaged from the flow of force in the vehicle drivetrain (1). An actual speed that is at least equivalent to a transmission input speed is monitored and an actuation pressure of the frictional shift element involved in the shift operation and/or a torque of the drive motor (9) is/are varied to change the actual speed to a nominal speed.

17 Claims, 5 Drawing Sheets

METHOD FOR OPERATING A VEHICLE DRIVETRAIN

This application claims priority from German patent application serial no. 10 2008 001 566.0 filed May 6, 2008.

FIELD OF THE INVENTION

The invention concerns a method for operating a vehicle drivetrain having a drive machine, a transmission device and a drive.

BACKGROUND OF THE INVENTION

In transmission devices known from practice and respectively designed as automatic transmissions constructed with frictional shift elements for producing various gear ratios, the gear changes required are carried out as controlled change-under-load shifts during which, in each case, at least one functional shift element of the transmission device is disengaged from the flow of force of a vehicle drivetrain and, correspondingly, at least one frictional shift element is engaged in the force flow. To keep to predefined shift times, which in each case correspond to the time interval between disengagement of the currently engaged gear ratio engaged to engagement of the target gear ratio, during the gear change so-termed nominal contact times of the frictional shift elements involved in the respective shift are specified.

From the nominal contact times a gradient of a nominal rotation speed of a transmission input speed or a nominal speed value equivalent thereto is determined, which is compared with a gradient of an actual speed value equivalent thereto, which can be determined from actual contact times of the shift elements. Depending on the deviation determined in each case between the gradient of the nominal speed and the gradient of the actual speed, and as a function of the operating situation of a vehicle's drivetrain at the time, an actuation pressure of a shift element to be engaged when engaging the required target gear in the force flow of the vehicle's drivetrain, or an actuation pressure of a shift element to be disengaged in order to disengage the gear engaged at the time from the force flow, is adjusted. In addition, the load transfer to be carried out during the shift, namely from the shift element being disengaged to the shift element being engaged, and the gear interval to be bridged during the nominal contact time and the speed gradient necessary for this, are realized by a pressure adjustment in the area of the shift element to be engaged or to be disengaged.

Since frictional shift elements in the disengaged operating condition produce a drag torque that has an adverse effect on the efficiency of an automatic transmission, transmission devices are increasingly made at least in part with interlocking instead of frictional shift elements, since interlocking shift elements essentially cause no drag torque and, compared with frictional shift elements, can transmit substantially higher torques while at the same time taking up less structural space.

The procedure described above cannot be carried out with transmission devices which are made at least in part with interlocking shift elements, since in contrast to frictional shift elements, in the case of interlocking shift elements the transmission capacity cannot be varied continuously by a pressure adaptation. Thus, it is not possible by means of a pure pressure regulation of a shift element either to produce reproducible shift times and the adaptation of the space gradients needed for this, or to establish a specified contact time and carry out the load transfer within a predefined shift time in shift operations during which a load transfer takes place between interlocking and frictional shift elements.

For example, if in a transmission device a thrust upshift is called for, to carry out which an interlock-type shift element has to be disengaged from the force flow of a vehicle's drivetrain and a frictional shift element has to be engaged in the force flow, no pressure regulation can be carried out in the area of the interlocking shift element. Furthermore, before being disengaged, the interlocking shift element has to be brought to an at least approximately load-free condition as a preliminary to the disengagement process, and to do this the thrust torque in the area of the interlocked connection or the interlock-type shift element must be reduced.

Moreover, for example in the case of a thrust downshift to carry out which a frictional shift element has to be disengaged from the force flow of the vehicle's drivetrain and an interlock-type shift element has to be engaged in the force flow, a transmission input speed or a transmission speed equivalent thereto has to be changed from the level of the synchronous speed of the actual gear engaged at the time to the level of the synchronous speed of the target gear, but this cannot be done by pressure regulation in the area of the frictional shift element.

Thus, the requirements for shift operations during which a load transfer has to take place between an interlock-type and a frictional shift element cannot be met in a satisfactory manner and with reproducible shift times.

SUMMARY OF THE INVENTION

Accordingly, the purpose of the present invention is to make available a method for operating a vehicle drivetrain, by means of which transmission ratio changes in a transmission device between an actual ratio and a target ratio, to carry out which a frictional or an interlocking shift element has to be engaged in the force flow of a vehicle drivetrain and, respectively, an interlocking or a frictional shift element has to be disengaged from the force flow of the vehicle drivetrain, can be carried out with reproducible shift and contact times in the area of the frictional shift element involved in the shift operation.

In the method according to the invention for operating a vehicle drivetrain with a drive mechanism, a transmission device and a drive output, when a transmission ratio change is called for in the transmission device between an actual ratio and a target ratio, to carry out which a frictional or an interlock-type shift element has to be engaged in a force flow of the vehicle's drivetrain and, respectively, an interlock-type or a frictional shift element has to be disengaged from the force flow of the vehicle's drivetrain, at least one actual speed equivalent to a transmission input speed is monitored and an actuation pressure of the frictional shift element involved in the shift and/or a torque of the drive mechanism is/are varied in order to modify the actual speed in the direction of a nominal speed.

With the method according to the invention an adaptation or regulation of a gradient of an actual speed at least equivalent to a transmission input speed and a regulation of a contact time of a frictional shift element, and, preferably during a thrust shift, the reduction of a thrust torque, is carried out in an operating-status-dependent manner not only by means of pressure regulation in the area of a frictional shift element or a regulation of the torque of the drive mechanism of a vehicle's drivetrain. In addition, if necessary, a respective operating-status-dependent switch to a regulation of the drive mechanism of a vehicle's drivetrain or to a regulation of the actuation pressure of the frictional shift element involved in the shift operation also takes place. The regulation or actuation of the respective frictional shift element involved in a transmission ratio change and the regulation of the torque of the drive mechanism, which respectively takes place as a function of the influencing of a torque or a speed, is extended compared with the procedures known from practice applicable in transmission devices made exclusively with frictional shift elements, by monitoring the deviation between the actual values and the nominal specifications.

The procedure according to the invention can be used with vehicle drivetrains made with internal combustion engines, electric motors, or even—as in the case of hybrid drivetrains—with drive mechanisms comprising more than one working machine, and in the last-mentioned drive mechanisms the torque or speed can be influenced in the area of one, or even at the same time in the area of more than one of the working machines involved in the drive mechanism.

This means that with the method according to the invention, during a shift operation carried out with the help of a frictional and an interlock-type shift element, from a point in time beyond which regulation in the area of the frictional shift element involved in the ratio change is no longer possible, for example because if the actuation pressure were to be lowered any further the frictional shift element would disengage, to further influence the speed gradient of the actual speed that is at least equivalent to a transmission input speed as calculated from the shift time a change is made to a regulation of one or more drive machines of a drive mechanism. The drive torque of the drive mechanism can be varied or the drive mechanism can be regulated as a function of the operating status of the vehicle's drivetrain at the time, by positive or negative action upon the motor which, respectively, results either in an increase or a decrease of the drive torque.

Furthermore, in a change-under-load in the vehicle's drivetrain during a shift operation in the transmission device the possibility exists of changing between regulation of the drive torque of the drive machine and regulation of the actuation pressure of the frictional shift element involved in the shift operation called for, in order to be able to keep to a predefined shift time and also to ensure reproducible contact times in the area of the frictional shift element and to keep the loading of the respective frictional shift element involved in a shift operation called for as low as possible during the shift operation.

In an advantageous variant of the method according to the invention, from a time when the actual speed deviates from a synchronous speed of the currently engaged gear ratio, the actuation pressure of the frictional shift element involved in the shift operation called for and/or the torque of the drive mechanism is/are varied to move the actual speed in the direction of the nominal speed, whereby a gradient of the actual speed can be adapted to an extent compatible with a predefined shift time and a specified contact time of the frictional shift element involved.

In a further variant of the method according to the invention, up to a point in time when the actual speed corresponds to a synchronous speed of the target gear ratio, the actuation pressure of the frictional shift element involved in the shift operation called for and/or the torque of the drive mechanism is/are varied in order to alter the actual speed in the direction of the nominal speed. This ensures that the actuation pressure and/or the torque of the drive mechanism is/are only changed during the shift operation, and after the end of the shift operation, i.e. once the synchronous speed of the target gear ratio has been reached, no further influence is exerted so that a vehicle constructed with a drivetrain operated in accordance with the invention will display driving behavior as expected by the driver.

In a variant of the process according to the invention, if a thrust upshift is called for in which an interlock-type shift element has to be disengaged from the force flow of the vehicle's drivetrain and a frictional shift element has to be engaged in the force flow, the interlocking shift element is shifted while it at least approximately free from load by means of positive motor action in the area of the drive mechanism, whereby the interlocking shift element can be changed from an engaged to a disengaged condition with small actuation forces and without producing, in the vehicle's drivetrain, a reaction torque that interferes with the driving comfort.

If, during a thrust uplift and during the monitoring of the actual speed that is at least equivalent to a transmission input speed, a gradient of the actual speed is determined to be smaller than a gradient of the nominal speed, then in a further advantageous variant of the method according to the invention it is provided that the actuation pressure of the frictional shift element to be engaged is varied so as to alter the actual speed in the direction of the nominal speed. This means that if the curve of the actual speed is too flat between the synchronous speed of the actual gear ratio to be disengaged in the transmission device and that of the target gear ratio to be engaged therein, the transmission capacity of the frictional shift element to be engaged is preferably increased, in order to adapt the actual speed to the curve of the specified nominal speed.

In another variant of the method according to the invention, if a thrust upshift is called for and a gradient of the actual speed is found to be larger than a gradient of the nominal speed, the drive torque of the drive mechanism is varied so as to alter the actual speed in the direction of the nominal speed. This means that during an operating status variation of the vehicle's drivetrain during which the variation of the actual speed is steeper than the specified variation of the nominal speed, the variation of the actual speed is adapted to that of the nominal speed by positive motor action, i.e. by increasing the drive torque of the drive mechanism.

In a further advantageous variant of the method according to the invention, if a thrust downshift is called for in which a frictional shift element has to be disengaged from the force flow of the vehicle's drivetrain and an interlocking shift element has to be engaged in the force flow, the actuation pressure of the frictional shift element to be disengaged is adjusted to a pressure level at which a desired nominal speed variation is obtained and a predefined shift time is established.

In addition, in further advantageous variants of the method according to the invention, if a thrust downshift is called for and an actual speed gradient is found to be smaller or larger than a gradient of the nominal speed, the torque of the drive mechanism, or the actuation pressure of the frictional shift element to be disengaged, is varied in order to alter the actual speed in the direction of the nominal speed.

If a traction upshift is called for in the transmission device in which an interlock-type shift element has to be disengaged from the force flow of the vehicle's drivetrain and a frictional shift element has to be engaged in the force flow, the torque of the drive mechanism is adjusted and the interlocking shift element is shifted while at least approximately free from load, whereby the interlocking shift element can be changed from an essentially engaged to a disengaged operating condition by means of small actuation forces and without producing reaction torques in the vehicle's drivetrain that reduce the driving comfort.

In further advantageous variants of the method according to the invention, if a traction upshift is called for and a gradient of the actual speed is determined to be smaller or larger than a gradient of the nominal speed, the actuation pressure of the frictional shift element to be engaged or the torque of the drive mechanism is adjusted in order to alter the actual speed in the direction of the nominal speed.

If a traction downshift is called for in which a frictional shift element has to be disengaged from the force flow of the vehicle's drivetrain and an interlocking shift element has to be engaged in the force flow, the actuation pressure of the frictional shift element to be disengaged is adjusted to a pressure level at which a desired variation of the nominal speed is obtained and a predefined shift time is established.

In other variants of the method according to the invention, if a traction downshift has been called for and a gradient of the actual speed is determined to be smaller or larger than a gradient of the nominal speed, then the torque of the drive mechanism or the actuation pressure of the frictional element to be disengaged is adjusted so as to alter the actual speed in the direction of the nominal speed.

BRIEF DESCRIPTION OF THE DRAWINGS

Other advantages and advantageous further developments of the invention emerge from the claims and from the example embodiment whose principle is described with reference to the drawings, which show:

DETAILED DESCRIPTION OF THE PREFERRED EMBODIMENTS

Figure 1:
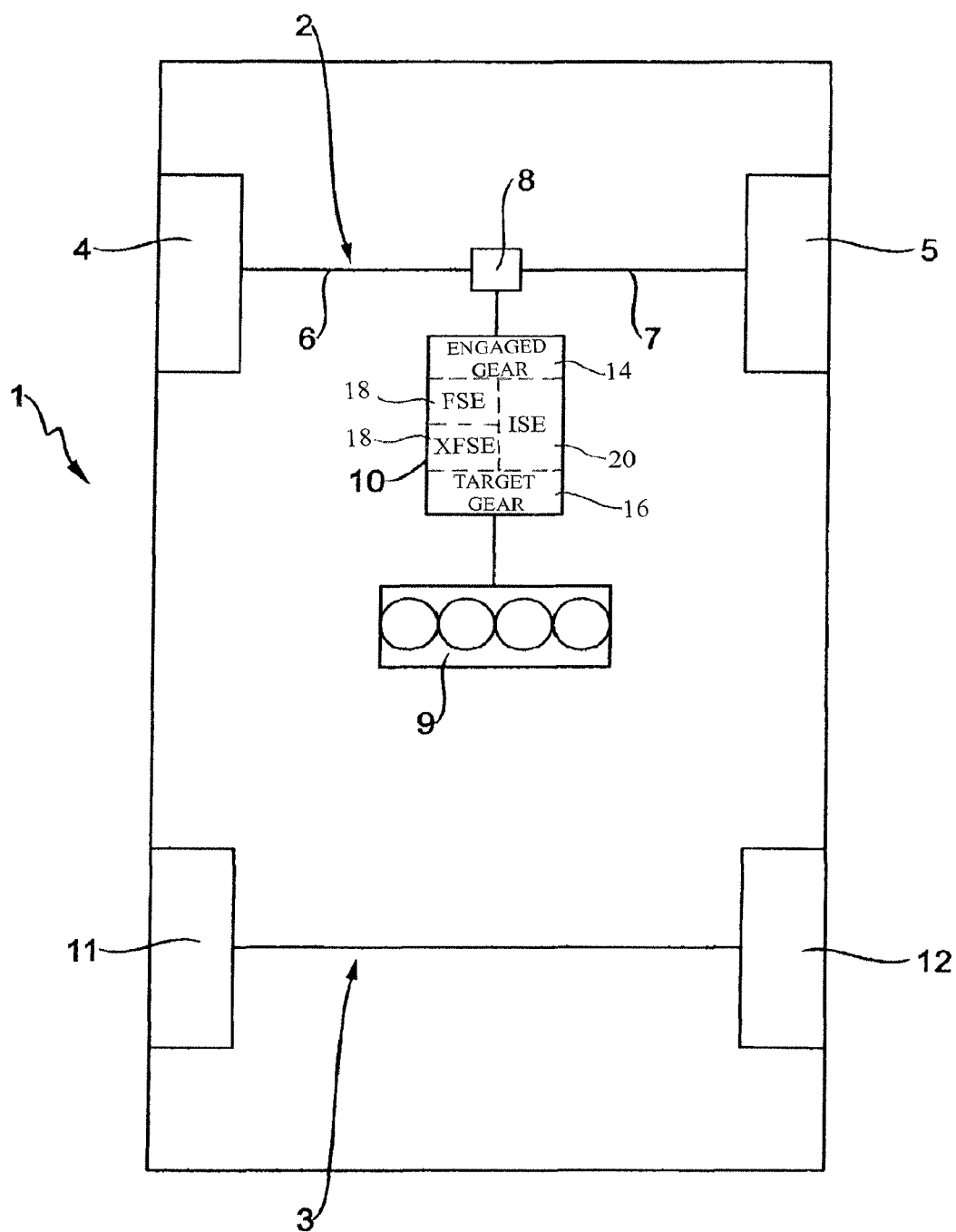
FIG. 1 Schematic representation of a vehicle's drivetrain

FIG. 1 shows a very schematic representation of a vehicle drivetrain 1 with a first vehicle axle 2 and a second vehicle axle 3, the first vehicle axle 2 being a front axle and the second vehicle axle 3 being a rear axle of the vehicle drivetrain 1. In this example the first vehicle axle 2 is the drive output of the vehicle drivetrain 1 and has two drive wheels 4, 5 connected by two driveshafts 6, 7 to a differential transmission unit 8. By means of the differential transmission 8, torque produced by a drive motor 9, which in this case is formed as an internal combustion engine, is distributed in equal parts to the two drive wheels 4 and 5. In addition, between the drive motor 9 and the differential transmission unit 8 is provided a transmission 10, which can be an automatic transmission or an automated manual-shift transmission and by means of which various gear ratios can be produced in a manner known per se.

The second vehicle axle 3 also has two wheels 11, 12, which cannot be driven by the drive motor 9. Depending on the application, however, the possibility also exists of bringing the second vehicle axle 3 into active connection with the drive motor 9 via a suitable distributor transmission device so as to produce an all-wheel-drive vehicle.

In the transmission 10, when certain gear ratio changes are called for between an actual gear 14 currently engaged in the transmission device 10 and a target gear 16 to be engaged in the transmission 10 in accordance with the ratio change called for, a frictional shift element 18 or an interlock-type shift element 20 has to be engaged in the force flow of the vehicle's drivetrain 1 and, respectively, an interlocking shift element 20 or a frictional shift element 18 has to be disengaged from the force flow of the vehicle's drivetrain. For example, when a thrust upshift is called for an interlocking shift element 20 has to be disengaged from the force flow of the vehicle's drivetrain 1 and a frictional shift element 18 has to be engaged in the force flow, whereas to carry out a thrust downshift a frictional shift element 18 has to be disengaged from the force flow of the vehicle's drivetrain and an interlocking shift element 20 has to be engaged in the force flow.

If a traction upshift is called for, then to carry it out an interlocking shift element has to be disengaged from the force flow of the vehicle's drivetrain 1 and a frictional shift element has to be engaged in the force flow, whereas to carry out a traction downshift that has been called for, a frictional shift element must be disengaged from the force flow of the vehicle's drivetrain and an interlocking shift element must be engaged in the force flow.

To carry out the required gear ratio change in the transmission device 10 with reproducible and predefined shift times and with reproducible and predefined contact times in the area of the respective frictional shift element involved in a shift operation in the transmission device, in such cases in which an interlocking shift element too is involved, the procedure proposed is as described below with reference to variations of the operating status of various structural groups of the vehicle drivetrain 1 according to FIG. 1, shown as functions of the time t in FIGS. 2 to 5.

Figure 2:
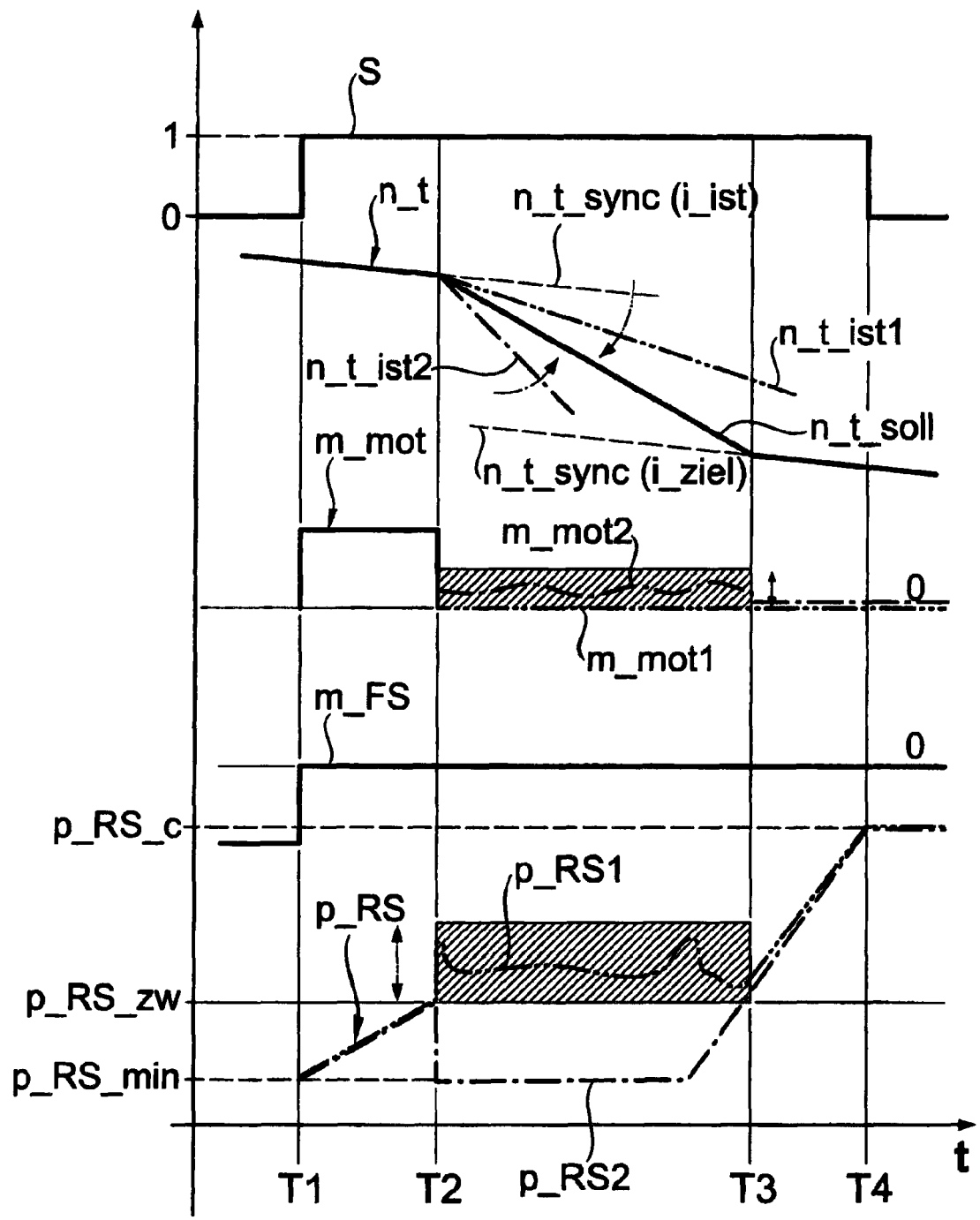
FIG. 2 Variations of several operating status parameters of various structural groups of the vehicle drivetrain in FIG. 1, which are adjusted during a thrust upshift carried out using the method according to the invention FIG. 3 Variations of the operating status parameters of the structural groups of the vehicle drivetrain in FIG. 1, which are adjusted during a thrust downshift carried out using the method according to the invention FIG. 4 Several operating status variations of the structural groups of the vehicle drivetrain occurring during a traction upshift carried out using the method according to the invention, represented in a manner corresponding to FIG. 2.
Figure 3:
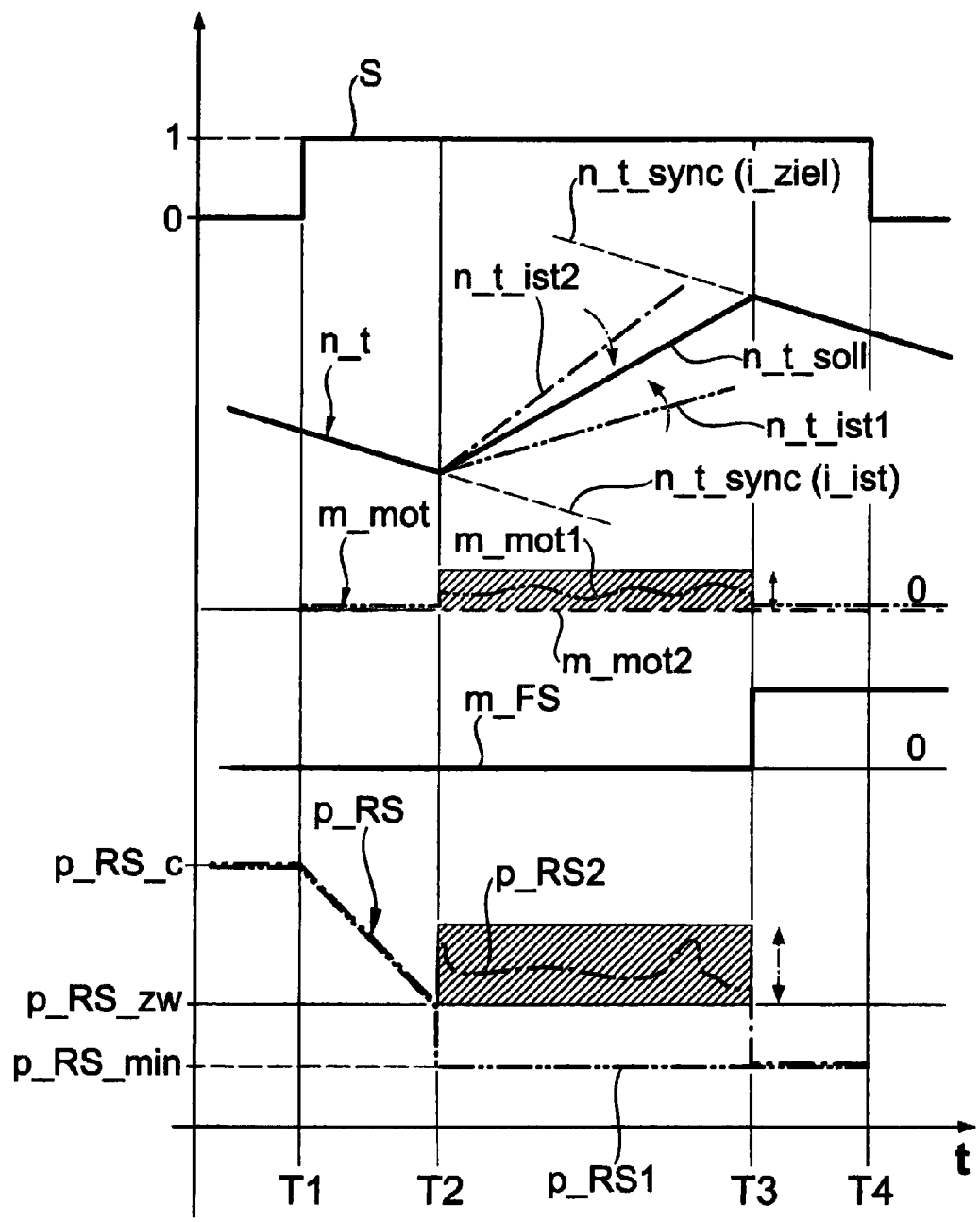
Figure 4:
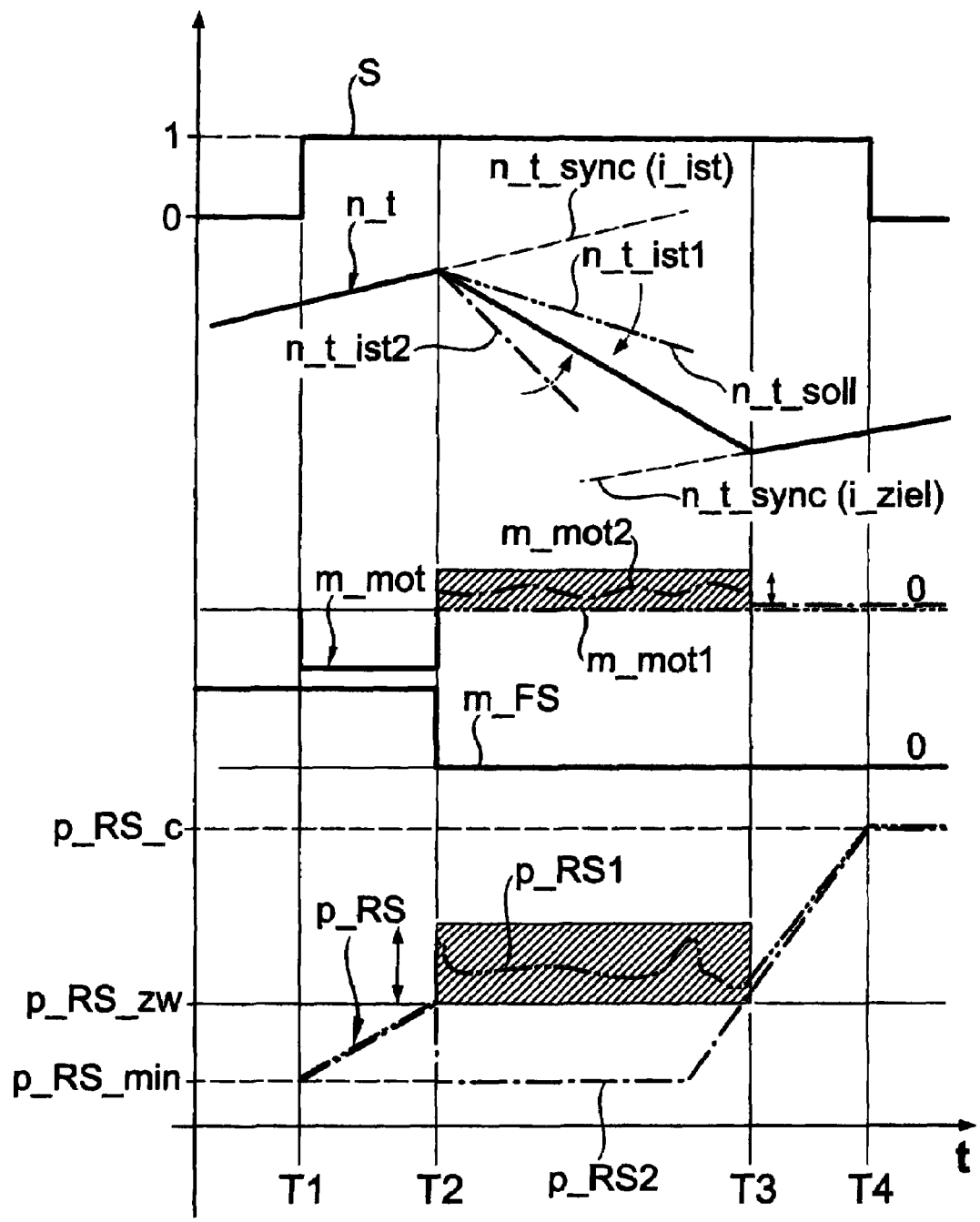
Figure 5:
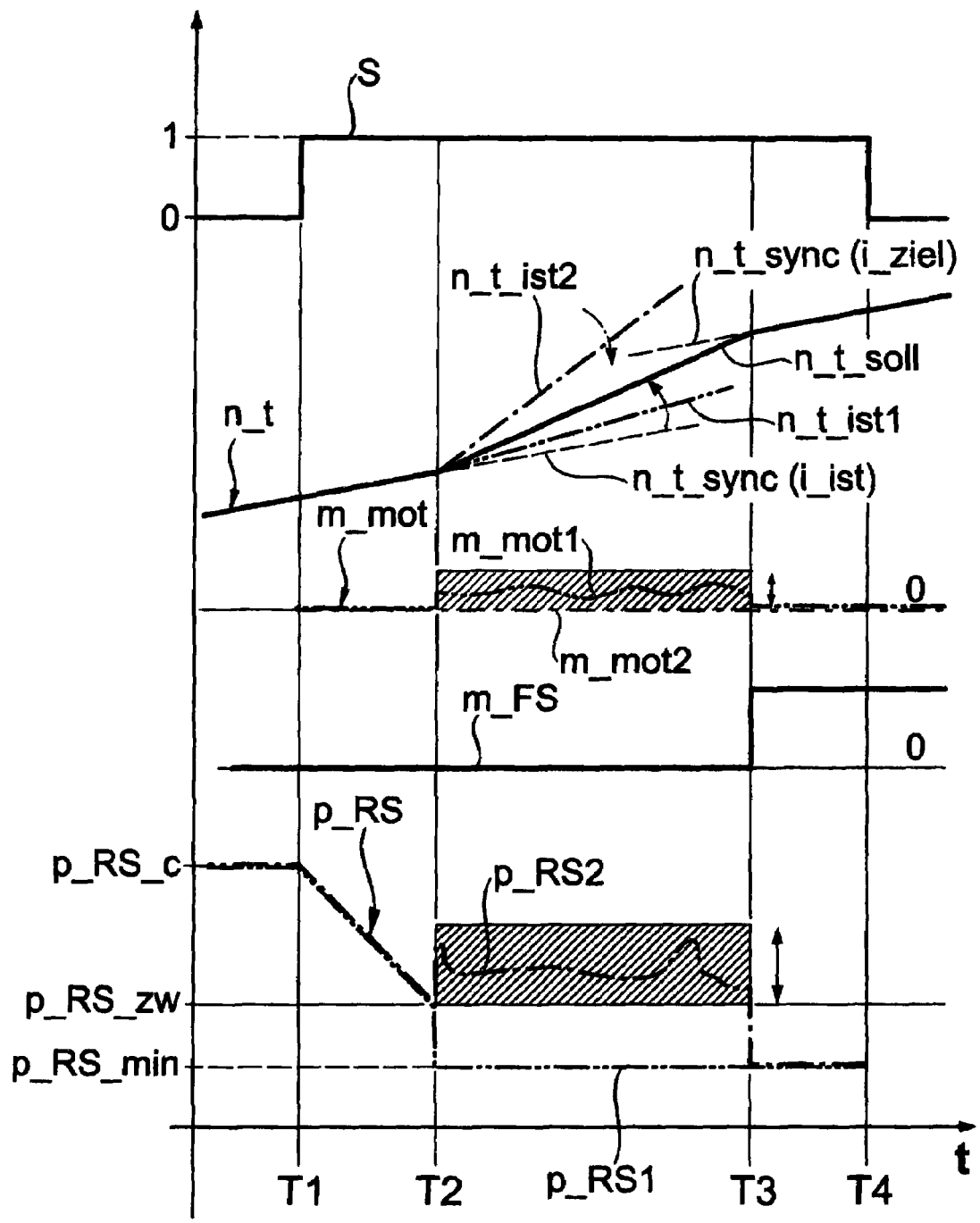
FIG. 5 Several operating status variations of the structural groups of the vehicle drivetrain occurring during a traction downshift carried out using the method according to the invention, represented in a manner corresponding to FIG. 2

When a vehicle drivetrain is operated in accordance with the invention, the operating status variations have the form shown in FIG. 2 during a thrust upshift, in FIG. 3 during a thrust downshift, in FIG. 4 during a traction upshift and in FIG. 5 during a traction downshift.

The variation S shown in each of FIGS. 2 to 5 represents the status of a transmission control device of the transmission 10, the variation S having the value 0 when no shift operation is called for by the transmission control device. If the value of S is 1, the transmission control device has called for a shift operation. This means that before a time T1 no shift has been called for in the transmission 10, and at time T1 a shift demand for a thrust upshift has been generated by the transmission control device.

In addition the variation of a turbine speed $n\_t$ of a starting device of the transmission 10 in this case made as a hydrodynamic torque converter is shown, the turbine speed $n\_t$ being equivalent to a transmission input speed of the transmission 10. Depending on the respective design of the vehicle drivetrain 1, instead of the turbine speed any other suitable speed in the drivetrain 1 equivalent to the transmission input speed can be considered.

Until a time-point T2 the turbine speed $n\_t$ corresponds to a synchronous speed $n\_t\_sync(i\_ist)$ of the actual gear ratio, which is produced when the actual gear ratio is engaged in the transmission 10. From time T2 onwards the turbine speed $n\_t$ has to be adjusted along the curve, shown in FIG. 2, of the nominal speed $n\_t\_soll$ until at time T3 it reaches the level of the synchronous speed $n\_t\_sync\ (i\_ziel)$ of the target gear ratio produced when the target gear is engaged in the transmission 10. In this case the variation of the nominal speed n_t_soll constitutes a nominal specification by means of which the required thrust upshift can be carried out within a predefined shift time.

To carry out the required thrust upshift, in the transmission 10 an interlock-type shift element of the transmission 10 has to be disengaged from the force flow of the vehicle's drivetrain 1 and a frictional shift element has to be engaged in the force flow. To be able to disengage the interlocking shift element with the smallest possible actuation forces and avoid a reaction torque in the vehicle drivetrain that would affect driving comfort adversely, at time T1 a torque m_mot is increased at time T1 to a predefined value as shown in FIG. 2, and kept constant at that value until time T2. This enables the interlocking shift element to be shifted essentially without load; the torque applied at any time on the interlocking shift element is indicated graphically in FIG. 2 by the variation m_FS.

In addition, an actuation pressure p_RS of the frictional shift element to be engaged is increased between times T1 and T2 from a minimum pressure value p_RS_min to an intermediate pressure value p_RS_zw, such that at the value of the intermediate pressure p_RS_zw the shift element to be engaged has a transmission capacity to which the variation of the nominal speed n_t_soll of the turbine speed adjusts.

The minimum value p_RS_min of the actuation pressure corresponds to a pre-filling pressure value at which idling of the frictional shift element is prevented and at which the frictional shift element is in a fully disengaged operating condition.

At the latest at time T2 monitoring of the actual turbine speed n_t_ist is started and as a function of its determined deviation from the nominal value specification or from the nominal speed n_t_soll, the actuation pressure p_RS of the frictional shift element to be engaged or the torque m_mot of the drive motor 9 is adjusted in the manner described below to manipulate the actual speed n_t_ist of the turbine in the direction of the nominal speed n_t_soll of the turbine.

The monitoring of the turbine speed n_t or its actual value n_t_ist is carried out at least between times T1 and T3, in order to be able to manipulate the actual turbine speed n_t_ist in the direction of the nominal turbine speed n_t_soll by the measures described below, and to be able to ensure constant shift times and reproducible contact times in the area of the frictional shift element involved in the shift operation.

If during the monitoring a variation of the actual speed n_t_ist is determined which corresponds to a first variation line n_t_ist1 of the actual speed shown in FIG. 2, whose gradient is smaller than the gradient of the nominal speed n_t_soll, then between times T2 and T3 the actuation pressure p_RS of the frictional shift element to be engaged is changed by pressure regulation in the manner indexed p_RS1 in FIG. 2 within a regulation zone indicated by shading, so that the variation of the actual speed n_t_ist approaches the variation of the nominal speed n_t_soll and the turbine speed n_t is sure to reach the synchronous speed n_t_sync(i_ziel) of the target gear at time T3.

In the event that the actual turbine speed corresponds to the first variation n_t_ist1, the torque m_mot of the drive motor 9 is reduced to 0 and follows a curve corresponding to the variation m_mot1 between times T2 and T3.

If monitoring of the turbine speed n_t between times T2 and T3 shows that it is following a curve that corresponds to a second variation n_t_ist 2, the actuation pressure p_RS of the frictional shift element to be engaged is reduced, in accordance with the variation line indexed p_RS2, to the minimum pressure value p_RS_min, while the torque m_mot of the drive motor 9, in accordance with a second variation line m_mot 2, is adjusted by regulation within a regulation range indicated graphically by the shaded area and the actual speed n_t_ist is adjusted to the nominal speed n_t_soll so that the turbine speed n_t is sure to reach the synchronous speed n_t_sync(i_ziel) of the target gear at time T3.

At time T3, when the load transfer in the transmission 10 has essentially been completed, the actuation pressure p_RS of the frictional shift element to be engaged is increased to approach a closing pressure p_RS_c at which the frictional shift element to be engaged has its full transmission capacity. The torque m_mot of the drive motor 9 is adjusted to the torque level that existed at time T1, when the shift command for the thrust upshift was generated in the transmission control device, so that the shift operation or gear ratio change in the transmission 10 is fully complete at time T4 when the actuation pressure p_RS reaches the closing pressure value p_RS_c and the characteristic S jumps from the value 1 to the value 0.

FIG. 3 also shows variations of the operating parameters of the vehicle drivetrain 1, which take place during a thrust downshift, such that to carry out the thrust downshift or the required gear ratio change from the gear engaged in the transmission 10 at the time the target gear to be engaged, a frictional shift element has to be disengaged from the force flow of the vehicle's drivetrain 1 and an interlock-type shift element has to be engaged in the force flow.

At time T1, when the shift command is issued to the transmission 10, the actuation pressure p_RS is adjusted toward the intermediate pressure value p_RS_zw at the level of which the nominal turbine speed n_t_soll is set. If during monitoring of the actual turbine speed n_t it is found to be following the first variation line n_t_ist1 of the actual turbine speed, the torque m_mot of the drive motor 9 is varied under control, for example in a manner corresponding to the first variation line m_mot, within the shaded regulation range in order to adjust the actual speed n_t_ist 1 toward the nominal speed n_t_soll so that it reaches synchronous speed n_t_sync (i_ziel) of the target gear at time T3.

If a turbine speed variation that corresponds to the first variation n_t_ist1 is detected by the monitoring, the actuation pressure p_RS of the frictional shift element to be disengaged is reduced to the minimum pressure value p_RS_min and left at that value.

If a turbine speed variation corresponding to the second variation n_t_ist2 is detected, the torque m_mot remains at the level set at time T2, which is essentially equal to 0, and the actuation pressure p_RS is adjusted under control, for example in accordance with the second variation line p_RS2 within the shaded regulation range, to drive the actual speed n_t_ist2 toward the nominal speed n_t_soll so that the synchronous speed n_t_sync (i_ziel) is sure to be reached at time T3.

At time T3, when the turbine speed n_t has reached the synchronous speed n_t_sync(i_ziel) of the target gear and when the interlock-type shift element to be engaged has been shifted to an engaged operating condition, the torque m_FS that can be transferred by the interlocking shift element increases abruptly to the thrust torque to be supported in the area of the drive motor 9, and if the monitoring detects too large a gradient of the actual speed n_t_ist2, at time T3 the actuation pressure p_RS is abruptly reduced to the level of the minimum pressure p_RS_min and left at that level.

The operating status variations of the vehicle drivetrain 1 according to FIG. 1 shown in FIG. 4 occur during a traction upshift in the transmission 10 when, between times T2 and T3, either a gradient of the actual turbine speed n_t_ist1 that is too flat, or a gradient of the actual turbine speed n_t_ist2 that is too steep, in each case compared with the nominal turbine speed n_t_soll, is detected.

To carry out the traction upshift called for at time T1, in the transmission 10 an interlocking shift element has to be disengaged from the force flow of the vehicle's drivetrain 1 and a frictional shift element has to be engaged in the force flow, such that the interlocking shift element is shifted under no load by virtue of negative motor action in the area of the drive motor 9, which takes place between times T1 and T2 by relieving the torque m_mot, and is changed at time T2 from an engaged to a disengaged operating condition with small actuation forces and without producing in the vehicle's drivetrain any reaction torques that interfere with driving comfort. For that reason the torque m_FS that can be transmitted by the interlocking shift element falls to 0 at time T2 and thereafter remains at that level.

If the monitoring detects a gradient of the actual speed variation n_t_ist1 that is too flat compared with the gradient of the nominal speed n_t_soll, the torque m_mot of the drive motor 9 is reduced to 0 and the actuation pressure p_RS of the frictional shift element to be engaged is varied under control from the intermediate pressure value p_RS_zw, within the regulation range shown as shaded in FIG. 4 and in accordance with the variation p_RS1 shown as an example, in order to adjust the actual turbine speed n_t_ist1 the nominal speed n_t_soll so as to reach the synchronous speed n_t_sync (i_ziel) of the target gear at time T3, i.e. within the predefined shift time and with the least possible contact time in the area of the frictional shift element to be engaged. Then the actuation pressure p_RS is increased to the level of the closing pressure p_RS_c at which the frictional shift element to be engaged in the force flow of the vehicle's drivetrain in order to carry out the traction upshift is completely engaged.

If during the monitoring period between times T2 and T3 a gradient of the actual turbine speed n_t_ist2 which is too steep compared with the gradient n_t_soll of the nominal speed is detected, the actuation pressure p_RS of the frictional shift element to be engaged is reduced to the level of the minimum pressure p_RS_min and in the area of the drive motor 9 its torque m_mot is varied, within the regulation range shown as shaded in accordance with the second variation line m_mot2, in order to adjust the actual turbine speed n_t_ist2 the variation n_t_soll of the nominal turbine speed, to reach the synchronous speed n_t_sync(i_ziel) of the target gear in the transmission 10 at time T3 and to carry out the required traction upshift within the predefined shift time.

In the case of the traction downshift that corresponds to the operating status variations shown in FIG. 5, in the transmission 10 and within a predefined shift time between points T2 and T3 an interlock-type shift element is engaged in, and a frictional shift element is disengaged from the force flow of the vehicle drivetrain 1.

To do this, when the traction downshift is called for at time T1 the actuation pressure p_RS of the frictional shift element to be disengaged is adjusted by time T2 to the level of the intermediate pressure p_RS_zw, at which the course n_t_soll of the nominal turbine speed is established.

If within the monitoring period a gradient n_t_ist1 of the actual turbine speed is detected, which is of smaller value than the gradient n_t_soll of the nominal turbine speed, the actuation pressure p_RS of the frictional shift element to be disengaged is reduced to the level of the minimum pressure value p_RS_min and shows the curve corresponding to the second variation p_RS2. At the same time, within the monitoring period the torque m_mot of the drive motor 9 is adjusted under control in the shaded regulation range, in such manner that the actual speed n_t_ist1 is adjusted to the nominal turbine speed n_t_soll and is sure to reach the synchronous speed n_t_sync (i_ziel) of the target gear at time T3.

If the actual turbine speed n_t_ist2 has a steeper gradient compared with the course of the nominal turbine speed n_t_soll, the torque m_mot of the drive motor remains at its level before time T2 whereas the actuation pressure p_RS of the frictional element to be disengaged is changed within the shaded regulation range so as to drive the actual speed n_t_ist2 to the nominal turbine speed n_t_soll and, at time T3, the synchronous speed n_t_sync(i_ziel) of the target gear in the transmission device 10 is surely reached, whereupon the actuation pressure p_RS is reduced at time T3 to the minimum pressure value p_RS_min and the interlocking shift element is changed from its disengaged to its engaged operating condition.

Furthermore, during load-change shift operations it is provided, within the monitoring period between times T2 and T3, that to drive the actual turbine speed n_t_ist to the nominal turbine speed n_t_soll, as a function of the operating status, changes are made between the regulation of the torque m_mot of the drive mechanism and the regulation of the actuation pressure p_RS of the frictional shift element to be disengaged or to be engaged, in order to be able to ensure reproducible speed gradients and thus contact times of always equal length for the frictional shift elements involved in each case in a gear ratio change in the transmission 10, and to carry out the gear change with reproducible shift times.

Fundamentally, the method according to the invention can be used for any shift operation involving at least two shift elements, one being a frictional shift element and another being an interlock-type shift element. For upshifts the shift element to be disengaged is in each case interlocking and the shift element to be engaged is frictional, whereas for downshifts the shift element to be disengaged is frictional and the shift element to be engaged is interlocking.

Preferably, for a thrust upshift the torque of the drive mechanism of a vehicle's drivetrain is increased by means of positive motor action directly after the shift command and before any change of the gradient of the transmission input speed or of a speed of a transmission device equivalent thereto, in order to shift the interlocking shift element that is to be disengaged while it is under no load. In the case of a traction upshift the interlocking shift element to be disengaged is shifted without load by virtue of negative motor action, during which the torque of the drive motor 9 is reduced.

During the process according to the invention the time of a shift operation is considered to be the period between departing from the synchronous point of the actual gear to be disengaged and reaching the synchronous point of the target gear in the transmission device to be engaged, as called for by the shift command. Between these two synchronous points there occurs a speed gradient of the transmission input speed or a transmission speed equivalent thereto, which is positive in the case of downshifts and negative in the case of upshifts.

In general, for all types of shift operations, in a transmission control unit of the transmission device so-termed nominal contact times are specified for the frictional shift elements involved in each case in the shift operation called for, with reference to which the gradients of the nominal transmission input speed or the transmission speed equivalent thereto are determined between the two aforesaid synchronous points.

In addition, the gradients of the nominal and the actual transmission input speed or transmission speed equivalent thereto between the two synchronous points are compared with one another. If during a shift operation it is found that the actual gradient differs from the nominal gradient so that the nominal contact time cannot be kept, a regulation mechanism is initiated. In this case, during the activated regulation mechanism and as a function of the difference between the nominal and the actual gradients of the transmission input speed or transmission speed equivalent thereto, the type of shift called for in each case and the load situation in the vehicle's drivetrain, first either pressure regulation in the area of the frictional shift element involved in the shift or regulation of the drive mechanism torque is carried out. If it is then found that by means of the pressure regulation in the area of the frictional shift element involved in the shift or a regulation of the drive mechanism torque the actual speed cannot be adapted to the nominal speed to the desired extent, a change is made to regulating the drive mechanism torque or to regulating the pressure in the area of the frictional shift element involved in the shift operation, or in some circumstances both are carried out simultaneously.

If a load change occurs in the vehicle's drivetrain while carrying out the shift operation, then again depending on the operating situation a change is made from regulating the drive mechanism torque to regulating the actuation pressure of the frictional shift element involved in the shift, or vice-versa, in order to adjust the gradient of the actual transmission input speed or transmission speed equivalent thereto to the gradient of the nominal speed.

For example, if during a traction upshift, after the interlock-type shift element to be disengaged has been disengaged, too flat a gradient of the actual transmission input speed is detected, for example because during the shift operation the driver is making a high power demand, the transmission capacity of the frictional shift element to be engaged is increased by raising the actuation pressure in order to increase the gradient of the actual transmission input speed.

At the last-described operating point of the vehicle drivetrain, if the driver reduces his power demand by a spontaneous release of the accelerator, the gradient of the actual transmission input speed increases abruptly. To change the gradient of the actual transmission input speed to the nominal speed, the frictional shift element to be engaged is depressurized to the maximum extent or its actuation pressure abruptly reduced. If the pressure drop in the area of the frictional shift element to be engaged is not sufficient to change the gradient of the actual transmission input speed in the direction of the gradient of the nominal transmission input speed, a change is made from regulating the pressure of the frictional shift element to be engaged, to regulating the torque of the drive mechanism, in order to change the actual transmission input speed to the nominal transmission input speed in the manner described in detail in connection with FIG. 3.

The last-described regulation change, for example, is effected in the reverse direction when the actual transmission input speed during thrust operation of the vehicle's drivetrain is adjusted to the nominal transmission input speed by regulating the torque of the drive mechanism and a spontaneous power demand is then made by the driver, which requires a change to regulation of the actuation pressure of the frictional shift element involved in the shift operation in order to change the actual transmission input speed to the desired extent of the nominal transmission input speed.

INDEXES

1 Vehicle drivetrain
2, 3 Vehicle axle
4, 5 Driven wheel
6, 7 Driveshaft
8 Differential transmission unit
9 Drive motor
10 Transmission
11, 12 Wheels
m_FS Torque of the interlocking shift element
m_mot Torque of the drive mechanism
n_t Turbine speed
p_RS Actuation pressure of the frictional shift element
S Variation
t Time
T1 to T4 Discrete time point

The invention claimed is:

1. A method of operating a vehicle drivetrain (1) having a drive motor (9), a transmission (10) and a drive output (2), and when shifting a gear in the transmission (10) from an actually engaged gear to a target gear, the gear shift being carried out with assistance of both a frictional shift element and an interlock-type shift element in a flow of force in the vehicle drivetrain (1), the method of completing the gear shift from the actually engaged gear to the target gear comprising the steps of:

engaging only one of the interlock-type shift element and the frictional shift element in the flow of force in the vehicle drivetrain while disengaging only the other of the frictional shift element and the interlock-type shift element from the flow of force in the vehicle drivetrain;

monitoring an actual speed during the gear shift, the actual speed being at least approximately equivalent to a transmission input speed (n_t);

adjusting the actual speed (n_t_ist1, n_t_ist2), during the gear shift, to a nominal speed (n_t_soll) by at least one of:

manipulating an actuation pressure (p_RS) of the frictional shift element associated with the gear shift, and manipulating a torque (m_mot) of the drive motor (9);

and adjusting the actual speed (n_t_ist, n_t_ist2) to the nominal speed (n_t_soll) from a point in time (T2) at which the actual speed (n_t_ist1, n_t_ist2) is different from a synchronous speed (n_t_sync(i_ziel)) of the target gear such that the gear shift, from the actually engaged gear to the target gear, is completed as soon as both the interlocking shift element is one of completely engaged and disengaged substantially without any load and the frictional shift element is one of completely disengaged and engaged.

2. The method according to claim 1, further comprising the step of adjusting the actual speed (n_t_ist1, n_t_ist2) to the nominal speed (n_t_soll) until a time point (T3) at which the actual speed (n_t_ist1, n_t_ist2) corresponds to the synchronous speed (n_t_sync(i_ziel)) of the target gear.

3. The method according to claim 1, further comprising the step of carrying out a thrust upshift, by disengaging the interlock-type shift element from the flow of force in the drivetrain (1) of the vehicle, and engaging the frictional shift element, with the interlock-type shift element being at least approximately free from load by positive action of the drive motor (9).

4. The method according to claim 1, further comprising the step of manipulating the actuation pressure (p_RS) of the frictional shift element to be engaged, if a thrust upshift is called for and a gradient of the actual speed (n_t_ist1) is smaller than a gradient of the nominal speed (n_t_soll), to adjust the actual speed (n_t_ist1) to the nominal speed (n_t_soll).

5. The method according to claim 1, further comprising the step of manipulating the torque (m_mot) of the drive motor (9), if a thrust upshift is called for and a gradient of the actual speed (n_t_ist2) is larger than a gradient of the nominal speed (n_t_soll), to adjust the actual speed (n_t_ist2) to the nominal speed (n_t_soll).

6. The method according to claim 1, further comprising the steps of carrying out a thrust downshift by disengaging the frictional shift element from the flow of force in the drivetrain (1) of the vehicle and engaging the interlock-type shift element in the flow of force in the drivetrain (1) of the vehicle, and adjusting the actuation pressure (p_RS) of the frictional shift element to a pressure level (p_RS_zw) at which the nominal speed (n_t_soll) is adjusted.

7. The method according to claim 1, further comprising the step of manipulating the torque (m_mot) of the drive motor (9), if a thrust downshift is called for and a gradient of the actual speed (n_t_ist1) is smaller than a gradient of the nominal speed (n_t_soll), to adjust the actual speed (n_t_ist1) to the nominal speed (n_t_soll).

8. The method according to claim 1, further comprising the step of adjusting the actual speed (n_t_ist2) to the nominal speed (n_t_soll), if a thrust downshift is called for and a gradient of the actual speed (n_t_ist2) is larger than a gradient of the nominal speed (n_t_soll), to manipulate the actuation pressure (p_RS) of the frictional shift element to be disengaged.

9. The method according to claim 1, further comprising the step of carrying out a traction upshift by disengaging the interlock-type shift element from the flow of force in the drivetrain (1) of the vehicle and engaging the frictional shift element in the flow of force, with the torque (m_mot) of the drive motor (9) being adjusted and the interlock-type shift element being shifted at least approximately free from load.

10. The method according to claim 1, further comprising the step of adjusting the actual speed (n_t_ist1) to the nominal speed (n_t_soll), if a traction upshift is called for and a gradient of the actual speed (n_t_ist1) is smaller than a gradient of the nominal speed (n_t_soll), by manipulating the actuation pressure (p_RS) of the frictional shift element.

11. The method according to claim 1, further comprising the step of manipulating the torque (m_mot) of the drive motor (9), if a traction upshift is called for and a gradient of the actual speed (n_t_ist2) is larger than a gradient of the nominal speed (n_t_soll), to adjust the actual speed (n_t_ist2) to the nominal speed (n_t_soll).

12. The method according to claim 1, further comprising the steps of carrying out a traction downshift by disengaging the frictional shift element from the flow of force in the drivetrain (1) of the vehicle and engaging the interlock-type shift element in the flow of force, and setting the actuation pressure (p_RS) of the frictional shift element to a pressure level (p_RS_zw) to adjust the nominal speed (n_t_soll).

13. The method according to claim 1, further comprising the step of adjusting the actual speed (n_t_ist1), if a traction downshift is called for and a gradient of the actual speed (n_t_ist1) is smaller than a gradient of the nominal speed (n_t_soll) to the nominal speed (n_t_soll), by manipulating the torque (m_mot) of the drive motor (9).

14. The method according to claim 1, further comprising the step of adjusting the actuation pressure (p_RS) of the frictional shift element to the actual speed (n_t_ist2), if a traction downshift is called for and a gradient of the actual speed (n_t_ist2) is larger than a gradient of the nominal speed (n_t_soll), by manipulating the nominal speed (n_t_soll).

15. A method of operating a vehicle drivetrain (1) having a drive motor (9), a transmission (10) and a drive output (2), and when shifting a gear in the transmission (10) from an actually engaged gear to a target gear, the gear shift being carried out with assistance of both a frictional shift element, having a variable transmission capacity, and an interlock-type shift element, without a variable transmission capacity, located in a flow of force in the vehicle drivetrain (1) and being accomplished by engaging only one of the friction shift element and the interlock-type shift element in the flow of force in the vehicle drivetrain (1) while disengaging the other of the interlock-type shift element and the frictional shift element from the flow of force in the vehicle drivetrain (1) during the gear shift, the method comprising the steps of:

completing the gear shift from an actually engaged gear to a target gear by disengaging only one of the interlock-type shift element and the frictional shift element from the flow of force in the vehicle drivetrain while engaging only the other of the frictional shift element and the interlock-type shift element in the flow of force in the vehicle drivetrain;

monitoring an actual speed during the gear shift, the actual speed being at least approximately equivalent to a transmission input speed (n_t), adjusting the actual speed (n_t_ist1, n_t_ist2) to a nominal speed (n_t_stoll) by at least one of:
   manipulating an actuation pressure (p_RS) of the fictional shift element associated with the gear shift, and
   manipulating a torque (m_mot) of the drive motor (9);
and one of engaging and disengaging the interlocking shift element substantially without any load.

16. The method according to claim 15, further comprising the step of adjusting the actual speed (n_t_ist, n_t_ist2) to the nominal speed (n_t_soll) from a point in time (T2) at which the actual speed (n_t_ist1, n_t_ist2) is different from a synchronous speed (n_t_sync(i_ziel)) of the target gear.

17. A method of operating a vehicle dirvetrain (1) having a motor (9), a transmission (10) and a drive output (2), and the transmission having both a plurality of frictional shift elements, each having a variable transmission capacity, and at least one interlock-type shift element, without a variable transmission capacity, located within the transmission (10) and along a flow of force of the vehicle drivetrain (1), and when shifting a gear in the transmission (10) from an actually engaged gear to a target gear, the gear shift being carried out by engaging one of the plurality of friction shift elements and the at least one interlock-type shift element located along the flow of force in the vehicle drivetrain (1) while disengaging the other of the at least one interlock-type shift element and one of the plurality of frictional shift elements from the flow of force in the vehicle drivetrain (1), the method comprising the steps of:

completing the gear shift from an actually engaged gear to a target gear by disengaging only one of the interlock-type shift element and the frictional shift element from the flow of force in the vehicle drivetrain while engaging only the other of the frictional shift element and the interlock-type shift element in the flow of force in the vehicle drivetrain;

monitoring an actual speed during the gear shift, the actual speed being at least approximately equivalent to a transmission input speed (n_t), adjusting the actual speed (n_t_ist1, n_t_ist2), during the gear shift, to a nominal speed (n_t_stoll) by at least one of:
   manipulating an actuation pressure (p_RS) of the at least one fictional shift element associated with the gear shift, and
   manipulating a torque (m_mot) of the motor (9);
and adjusting at least one of the actuation pressure (p_RS) of the at least one frictional shift element associated with the gear shift and the actual speed (n_t_ist1, n_t_ist2) based on a gradient of at least one of the actual speed (n_t_ist1, n_t_ist2) and the nominal speed (n_t_soll) such that the at least one interlocking shift element is one of engaged and disengaged substantially without any load.

* * * * *